(12) United States Patent
Suda et al.

(10) Patent No.: US 8,220,654 B2
(45) Date of Patent: Jul. 17, 2012

(54) FUEL TANK STRUCTURE

(75) Inventors: Touru Suda, Toyota (JP); Masayuki Hirose, Okazaki (JP); Toru Shirasaki, Nissin (JP); Takayuki Usui, Chita-gun (JP); Taku Masaki, Gifu (JP); Hiroaki Suganuma, Inazawa (JP)

(73) Assignee: Aisan Kogyo Kabushiki Kaisha, Obu-shi (JP)

( * ) Notice: Subject to any disclaimer, the term of this patent is extended or adjusted under 35 U.S.C. 154(b) by 550 days.

(21) Appl. No.: 12/360,885

(22) Filed: Jan. 28, 2009

(65) Prior Publication Data

US 2009/0194529 A1    Aug. 6, 2009

(30) Foreign Application Priority Data

Jan. 31, 2008    (JP) .................................. 2008-021267

(51) Int. Cl.
*B65D 8/00* (2006.01)
*B65D 1/24* (2006.01)
*B65D 85/00* (2006.01)
*B60P 3/00* (2006.01)

(52) U.S. Cl. ...... 220/562; 220/4.12; 220/4.14; 220/553; 220/555; 220/563; 220/564

(58) Field of Classification Search .................. 220/4.12, 220/4.13, 4.14, 553, 554, 555, 562, 563, 220/564; 123/495; 141/126
See application file for complete search history.

(56) References Cited

U.S. PATENT DOCUMENTS

| | | | | |
|---|---|---|---|---|
| 5,396,872 A | * | 3/1995 | Ruger et al. | 123/514 |
| 5,797,373 A | * | 8/1998 | Kleppner et al. | 123/495 |
| 5,941,279 A | * | 8/1999 | Frank et al. | 137/574 |

FOREIGN PATENT DOCUMENTS

| | | |
|---|---|---|
| JP | 60-161621 | 10/1985 |
| JP | 2007 069747 | 3/2007 |

OTHER PUBLICATIONS

Japanese Office Action and the English Translation thereof (Japanese Application No. 2008-021267).

* cited by examiner

*Primary Examiner* — Anthony Stashick
*Assistant Examiner* — Madison L Wright
(74) *Attorney, Agent, or Firm* — Marshall, Gerstein & Borun LLP

(57) ABSTRACT

A partitioning plate, that is positioned between a jet pump and a main suction, is set within a reserve cup of a fuel tank, so as to separate an interior of the reserve cup into a fuel feed-out chamber in which the main suction is disposed, and a fuel introducing chamber in which the jet pump is disposed. The partitioning plate is disposed at an incline with respect to a vehicle longitudinal direction. In cases in which acceleration in any of a forward direction, a rearward direction, a leftward direction and a rightward direction of a vehicle acts on fuel within the reserve cup, some of fuel within the fuel introducing chamber flows into the fuel feed-out chamber. A fuel tank structure is provided that can reliably ensure fuel within the fuel feed-out chamber in a case in which acceleration arises at fuel within a fuel accommodating portion.

10 Claims, 4 Drawing Sheets

FUEL TANK STRUCTURE

CROSS-REFERENCE TO RELATED APPLICATION

This application claims priority under 35 USC 119 from Japanese Patent Application No. 2008-021267, the disclosure of which is incorporated by reference herein.

BACKGROUND OF THE INVENTION

1. Field of the Invention

The present invention relates to a fuel tank structure that is provided in a vehicle such as an automobile or the like.

2. Description of the Related Art

As a fuel tank structure that is provided in a vehicle such as an automobile or the like, Japanese Patent Application Laid-Open (JP-A) No. 2007-69747 discloses a structure having a separating wall that divides the interior of a sub-cup into a main chamber and an auxiliary chamber. In this structure, fuel flows-in into the auxiliary chamber due to the negative pressure that is generated within a jet pump by the driving of an engine. When the fuel within the auxiliary chamber exceeds the height of the separating wall, the fuel flows into the main chamber. Then, the fuel within the main chamber is sucked from a suction filter.

It is assumed that, as a vehicle travels, acceleration in a specific direction acts on the fuel tank structure (the fuel tank). However, in the structure of JP-A No. 2007-69747, when the amount of fuel within the main chamber (a fuel feed-out chamber) becomes low, the fuel becomes unevenly distributed due to acceleration that is generated, and therefore, there may be cases in which suction from the suction filter becomes difficult. For example, in the structure of JP-A No. 2007-69747, if the separating wall is disposed in a vehicle longitudinal direction, and the main chamber is set at the left side in a vehicle transverse direction and the auxiliary chamber is set at the right side, when acceleration is generated toward the right side in the vehicle transverse direction, the fuel within the auxiliary chamber moves in the direction of moving away from the separating wall. Therefore, it becomes difficult for fuel to flow-in from the auxiliary chamber to the main chamber.

Accordingly, it is desired to be able to reliably supply fuel from a fuel introducing chamber to a fuel feed-out chamber in a case in which acceleration acts on fuel within a sub-cup (a fuel accommodating portion).

SUMMARY OF THE INVENTION

The present invention provides a fuel tank structure that can reliably ensure fuel in a fuel feed-out chamber in a case in which acceleration arises at fuel within a fuel accommodating portion.

A fuel tank structure of an aspect of the present invention has: a fuel accommodating portion that accommodates fuel; and a partitioning plate (partitioning wall) partitioning an interior of the fuel accommodating portion into a fuel feed-out chamber, that is for feeding fuel out to an exterior, and a fuel introducing chamber, to which fuel is introduced from the exterior, wherein the partitioning plate is disposed at an incline with respect to a vehicle longitudinal direction.

In the fuel tank structure of the above-described aspect, the fuel accommodating portion is separated by the partitioning plate into the fuel feed-out chamber and the fuel introducing chamber. Fuel from the exterior is first introduced into the fuel introducing chamber. Then, when the liquid surface of the fuel of the fuel introducing chamber exceeds the partitioning plate, the fuel that has exceeded the partitioning plate flows into the fuel feed-out chamber.

Here, the partitioning plate is disposed at an incline with respect to the vehicle longitudinal direction. Accordingly, in cases in which acceleration in any of the forward direction, the rearward direction, the leftward direction and the rightward direction of the vehicle acts on the fuel of the fuel accommodating portion, some of fuel within the fuel introducing chamber crosses-over the partitioning plate and flows into the fuel feed-out chamber. Namely, in the present invention, in cases in which acceleration in any of the aforementioned directions arises, fuel can reliably be supplied from the fuel introducing chamber to the fuel feed-out chamber.

In the fuel tank structure of the above-described aspect of the present invention, a top end of a peripheral wall of the fuel accommodating portion may be structured to be higher than a top end of the partitioning plate.

Due to the above-described structure, the fuel within the fuel introducing chamber can even more reliably be prevented from crossing-over the peripheral wall and inadvertently flowing-out to the exterior.

Because the present invention is structured as described above, fuel can be reliably ensured within the fuel feed-out chamber in a case in which acceleration arises at the fuel within the fuel accommodating portion.

DETAILED DESCRIPTION OF THE INVENTION

Figure 1:
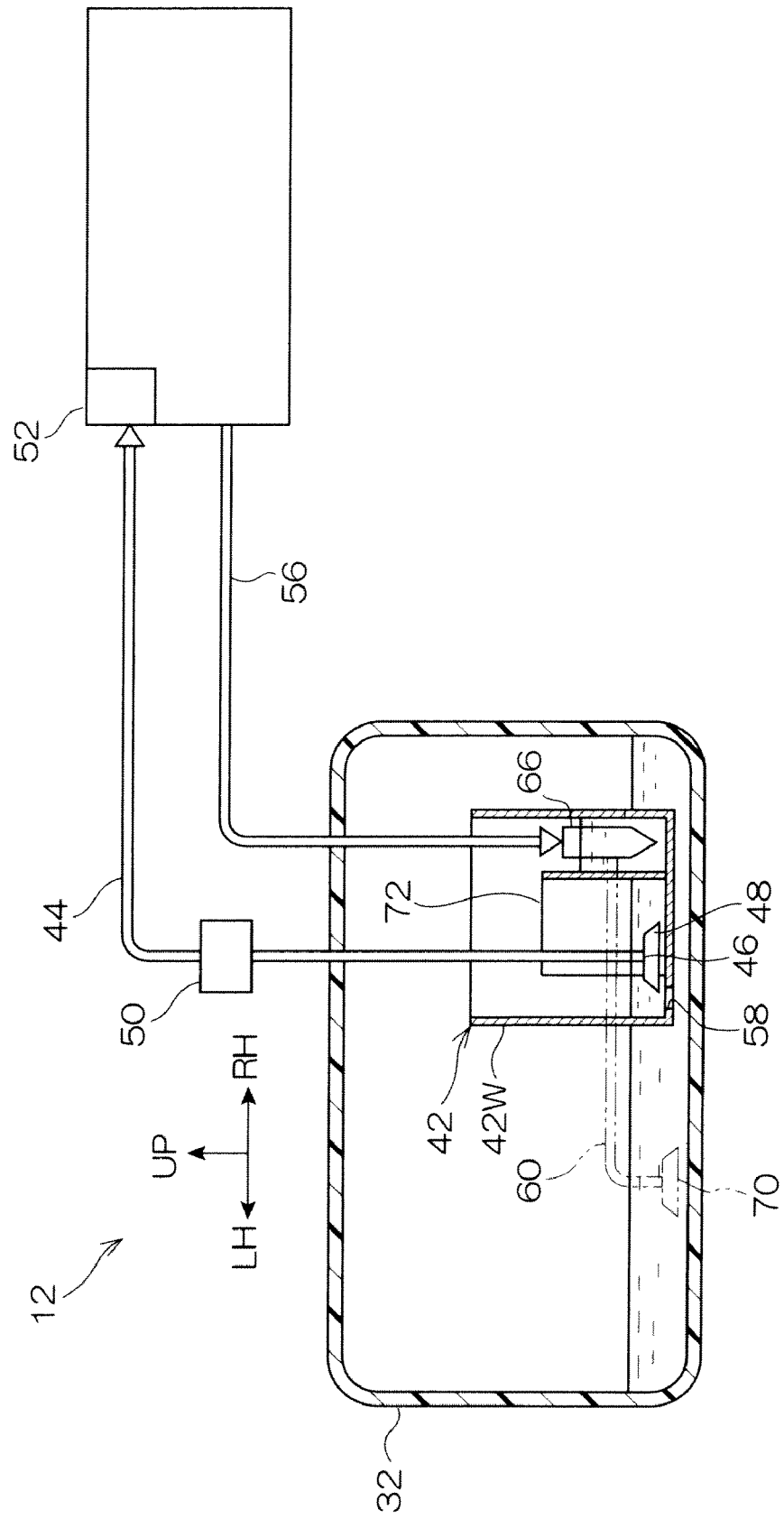
FIG. 1 is a schematic structural drawing showing a fuel tank structure of an exemplary embodiment of the present invention.

A fuel tank structure 12 of an exemplary embodiment of the present invention is shown in FIG. 1. In the drawings, the forward direction of the vehicle is denoted by arrow FR, the left side in a vehicle transverse direction is denoted by arrow LH, the right side in the vehicle transverse direction is denoted by arrow RH, and the upward direction is denoted by arrow UP.

The fuel tank structure 12 has a fuel tank main body 32 in which fuel is accommodated. An unillustrated filler pipe is provided at the upper portion of the fuel tank main body 32 such that fuel can be supplied to the fuel tank main body 32. Note that the fuel accommodating portion of the present invention is structured by the fuel tank main body 32. Namely, in the fuel tank structure of the present exemplary embodiment, only one fuel accommodating portion is provided.

A box-shaped reserve cup 42 whose top surface is open is disposed within the fuel tank main body 32. The lower portion of a fuel feed-out pipe 44 is positioned in a vicinity of the floor portion of the reserve cup 42. One end (the lower end) of the fuel feed-out pipe 44 is a main suction 46 that is equipped with a filter 48. A suction pump 52 is connected to the other end (the upper end) via a fuel filter 50. Further, an unillustrated fuel supply pipe is connected to the suction pump 52, and the fuel within the reserve cup 42 can be supplied to an unillustrated engine or the like due to the driving of the suction pump 52.

The upper end of a return pipe 56 is connected to the suction pump 52, and the lower end of the return pipe 56 is disposed within the reserve cup 42 (in particular, in the present exemplary embodiment, a fuel introducing chamber 42A that will be described later). Some of the fuel that is sucked by the suction pump 52 is returned to the interior of the reserve cup 42 through the return pipe 56.

A jet pump 66 is attached to the lower end of the return pipe 56. One end of a fuel transfer pipe 60 is connected to the jet pump 66. The other end of the fuel transfer pipe 60 is disposed within the fuel tank main body 32 (but at the outer side of the reserve cup 42), and a filter 70 is attached thereto. Due to the return fuel that is returned through the return pipe 56, negative pressure acts on the jet pump 66. Due to this negative pressure, fuel is transferred through the fuel transfer pipe 60 from the exterior to the interior of the reserve cup 42.

Figure 2:
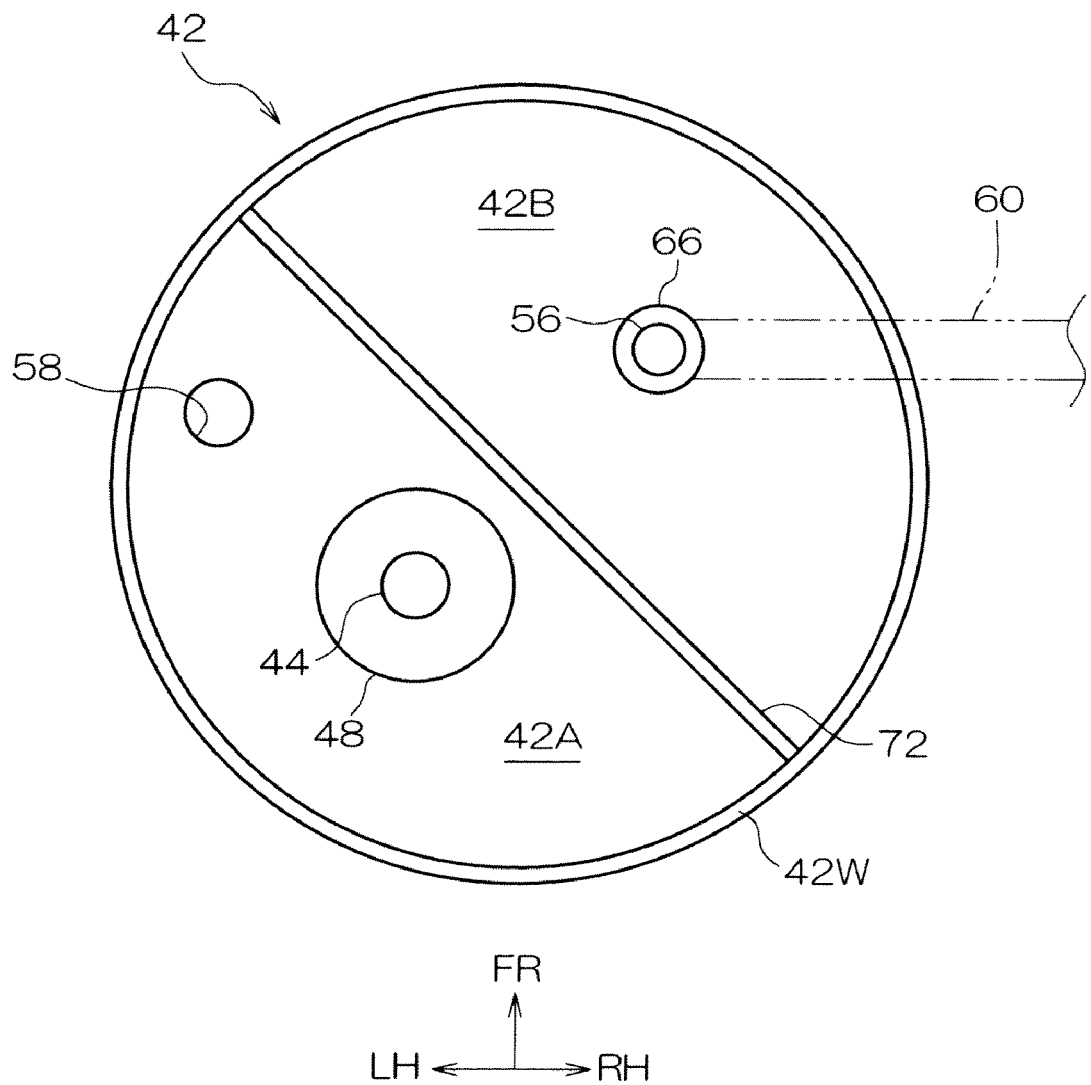
FIG. 2 is a plan view showing, in an enlarged manner, a reserve cup that structures the fuel tank structure of the exemplary embodiment of the present invention.
Figure 3:
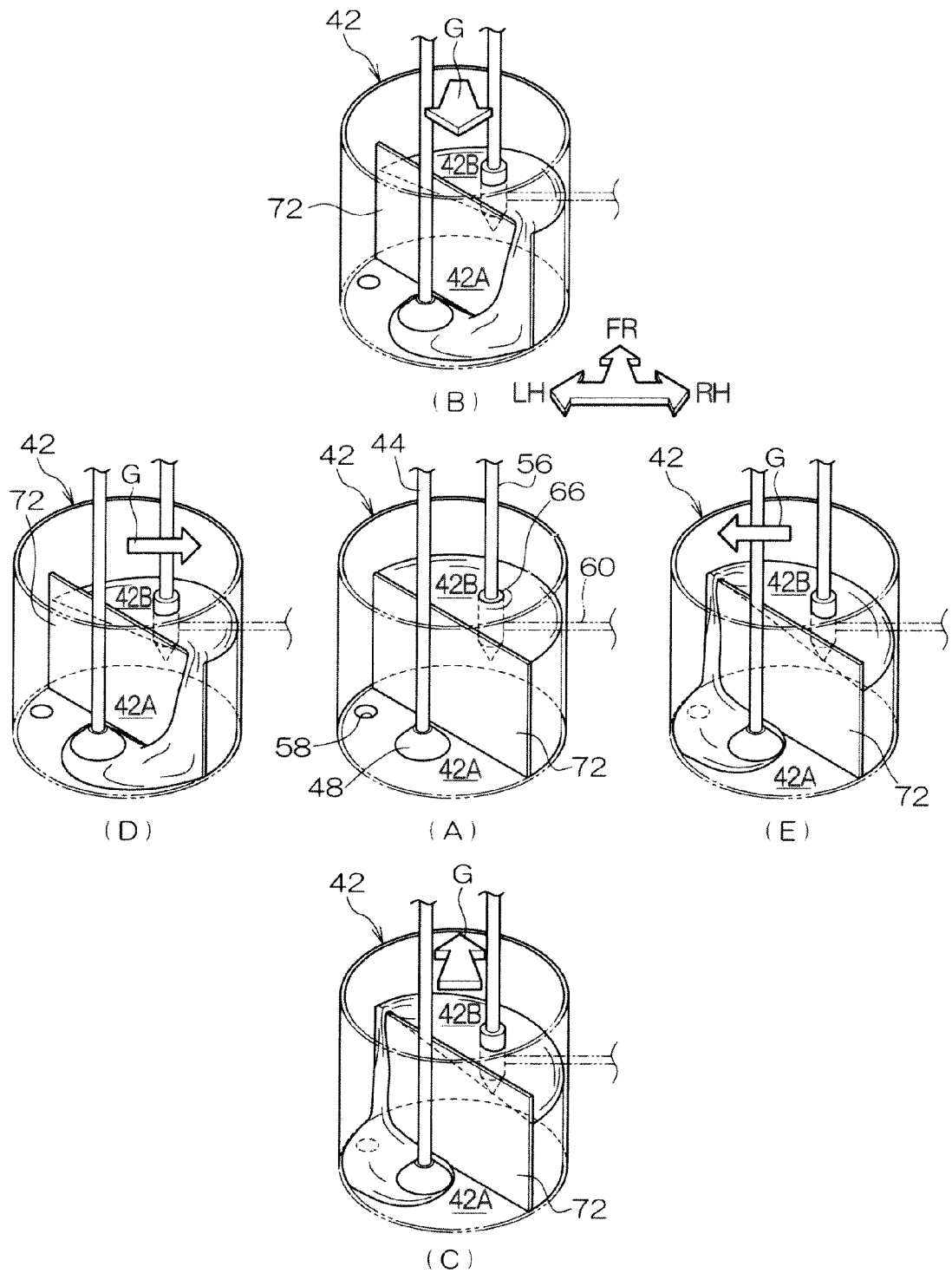
FIG. 3 is a perspective view showing, in an enlarged manner, the reserve cup structuring the fuel tank structure of the exemplary embodiment of the present invention, and shows the behavior of fuel within the reserve cup in accordance with the direction of acceleration.

As shown in FIG. 2 and FIG. 3 as well, a partitioning plate 72 through which fuel cannot pass is set within the reserve cup 42 so as to be positioned between the jet pump 66 and the main suction 46. The partitioning plate 72 stands erect substantially perpendicularly from the floor portion of the reserve cup 42 (the fuel accommodating portion). As can be understood from FIG. 1, the height of the partitioning plate 72 is made to be lower than a peripheral wall 42W of the reserve cup 42. The top end of a peripheral wall 42W of the reserve cup 42 is at a position that is higher than the top end of the partitioning plate 72.

The floor side and the lateral sides of the partitioning plate 72 contact inner surfaces of the reserve cup 42. The interior of the reserve cup 42 is positioned is separated into a fuel feed-out chamber 42A in which the main suction 46 is disposed, and the fuel introducing chamber 42B in which the jet pump 66 is disposed. Accordingly, the fuel that flows into the fuel introducing chamber 42B is stored within the fuel introducing chamber 42B until the liquid level thereof reaches the top end of the partitioning plate 72. Then, when the liquid level of the fuel within the fuel introducing chamber 42B reaches (exceeds) the top end of the partitioning plate 72, some of the fuel crosses-over the partitioning plate 72 and flows into the fuel feed-out chamber 42A.

As shown in detail in FIG. 2, the partitioning plate 72 of the present invention is disposed at an incline with respect to the vehicle longitudinal direction. In particular, in the present exemplary embodiment, the partitioning plate 72 is disposed at an angle of substantially 45° with respect to the vehicle longitudinal direction, when the reserve cup 42 is seen in plan view (viewed from above). Further, the fuel introducing chamber 42B is positioned at the diagonally front right side of the partitioning plate 72, and the fuel feed-out chamber 42A is positioned at the diagonally rear left side of the partitioning plate 72.

A communicating hole 58 is formed in the lower portion of the reserve cup 42. Due to fuel moving through the communicating hole 58, the liquid levels of the fuel at the interior and at the exterior of the fuel feed-out chamber 42A become the same.

In the fuel tank structure 12 of the present exemplary embodiment that is structured in this way, fuel within the reserve cup 42 (the fuel feed-out chamber 42A) can be fed-out to an unillustrated engine or the like by the driving of the suction pump 52. Further, some of the fuel at this time can be returned to the interior of the fuel feed-out chamber 42A through the return pipe 56.

At the jet pump 66, negative pressure is generated by the return fuel. Due to this negative pressure, fuel is transferred through the fuel transfer pipe 60 from the exterior to the interior (into the fuel introducing chamber 42B) of the reserve cup 42.

In the present exemplary embodiment, the partitioning plate 72 is provided within the reserve cup 42, and the interior of the reserve cup 42 is separated into the fuel feed-out chamber 42A and the fuel introducing chamber 42B. Therefore, a constant amount of fuel that has flowed-in into the reserve cup 42 is ensured at the fuel introducing chamber 42B. Then, when the liquid level of the fuel within the fuel introducing chamber 42B exceeds the partitioning plate 72, fuel crosses-over the partitioning plate 72 and flows into the fuel feed-out chamber 42A. Here, because the top end of the peripheral wall 42W of the reserve cup 42 is at a position that is higher than the top end of the partitioning plate 72, the fuel within the fuel introducing chamber 42B does not inadvertently cross-over the peripheral wall 42W from the reserve cup 42 and flow-out to the exterior.

Here, in the present exemplary embodiment, the partitioning plate 72 is disposed at an incline with respect to the vehicle longitudinal direction. Accordingly, in cases in which acceleration in any of the forward direction, the rearward direction, the leftward direction and the rightward direction of the vehicle acts on the reserve cup 42, some of the fuel within the fuel introducing chamber 42B crosses-over the partitioning plate 72 and flows into the fuel feed-out chamber 42A.

In FIG. 3, given that (A) illustrates a state in which acceleration is not applied at the fuel tank structure 12 of the present exemplary embodiment, the behavior of the fuel in states (B) through (E) in which acceleration acts in the forward direction, the rearward direction, the leftward direction and the rightward direction of the vehicle respectively, are illustrated. (The direction after the acceleration is denoted by arrow G). Namely, as shown in state (B), in a case in which acceleration toward the vehicle rear side is applied such as, for example, at times when the vehicle accelerates or travels upward on a slope or the like, the fuel within the fuel introducing chamber 42B moves rearward, crosses-over the partitioning plate 72, and flows-out to the fuel feed-out chamber 42A. Further, as shown in state (C), in a case in which acceleration toward the front of the vehicle is applied such as at times when the vehicle decelerates or travels down a slope or the like, the fuel within the fuel introducing chamber 42B moves forward, crosses-over the partitioning plate 72, and flows-out to the fuel feed-out chamber 42A.

As shown in state (D) of FIG. 3, in a case in which acceleration toward the vehicle right side is applied such as, for example, when the vehicle turns left or the like, the fuel within the fuel introducing chamber 42B moves rightward. Therefore, in a vicinity of the rear end portion of the partitioning plate 72, the liquid level becomes higher than the partitioning plate 72. Due thereto, some of the fuel within the fuel introducing chamber 42B crosses-over the partitioning plate 72, and flows-out to the fuel feed-out chamber 42A. Further, as shown in state (E) of FIG. 3, in a case in which acceleration toward the vehicle left side is applied such as, for example, when the vehicle turns right or the like, the fuel within the fuel introducing chamber 42B moves leftward. Therefore, in a vicinity of the front end portion of the partitioning plate 72, the liquid level becomes higher than the partitioning plate 72. Due thereto, some of the fuel within the fuel introducing chamber 42B crosses-over the partitioning plate 72, and flows-out to the fuel feed-out chamber 42A. Note that, in every case, the fuel within the fuel introducing chamber 42B does not inadvertently cross-over the peripheral wall 42W from the reserve cup 42 and flow-out to the exterior.

Figure 4:
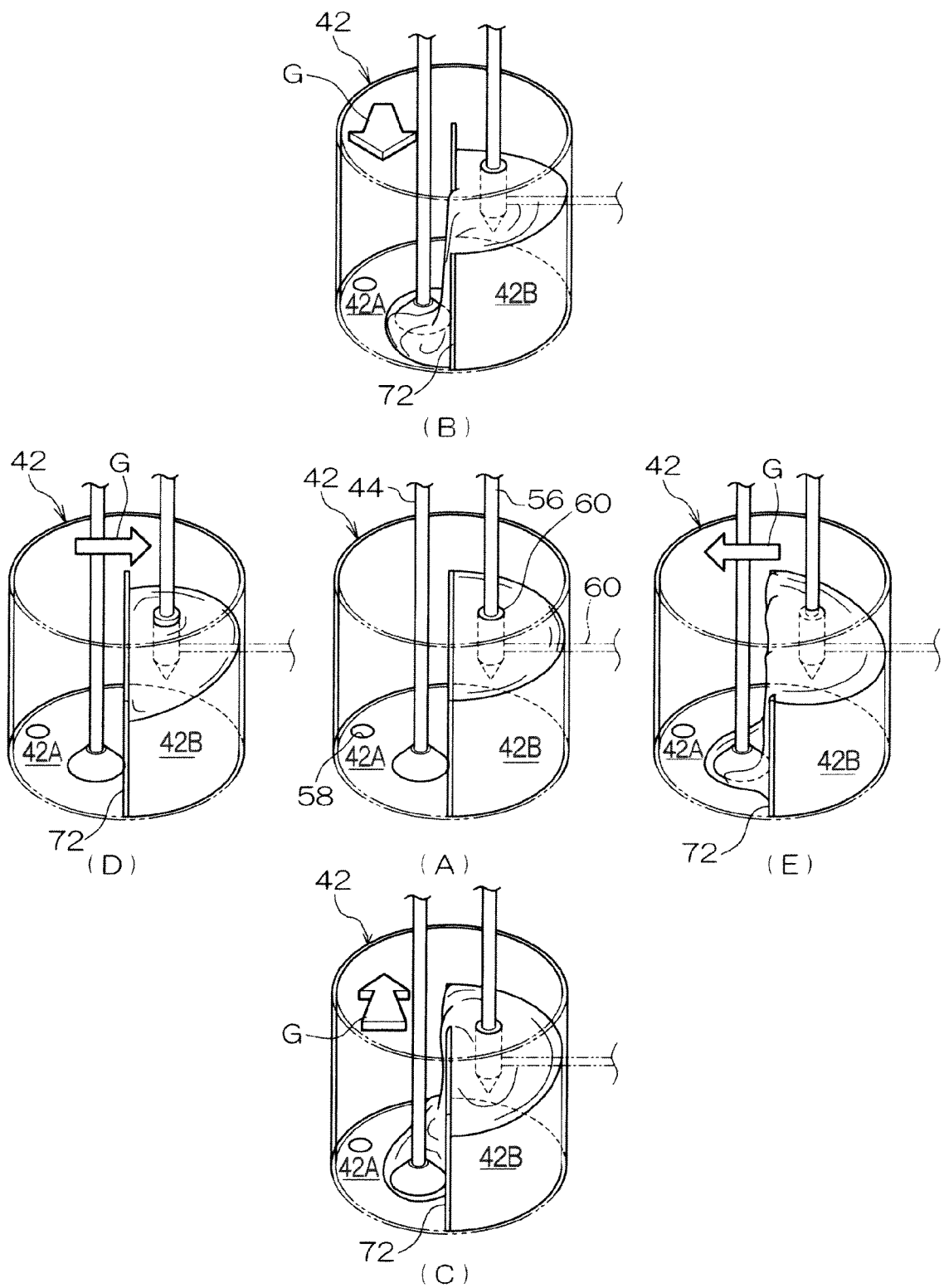
FIG. 4 is a perspective view showing, in an enlarged manner, a reserve cup structuring a fuel tank structure of a comparative example, and shows the behavior of fuel within the reserve cup in accordance with the direction of acceleration.

In FIG. 4, a fuel tank structure that is structured the same as the present exemplary embodiment except that the partitioning plate 72 is disposed in the vehicle longitudinal direction, is shown as a comparative example, with the vicinity of the reserve cup 42 being illustrated in an enlarged manner. Note that, in the comparative example, only the direction of placing the partitioning plate 72 differs in this way from the above-described exemplary embodiment, and therefore, structural elements that are the same as the exemplary embodiment are denoted by the same reference numerals. In FIG. 4 as well, a state in which acceleration is not applied is shown as state (A).

In the comparative example, as shown in state (B) of FIG. 4, in a case in which acceleration toward the vehicle rear side is applied, the fuel within the fuel introducing chamber 42B moves rearward, and the liquid level becomes higher than the partitioning plate 72 in a vicinity of the rear end of the partitioning plate 72. Therefore, some of the fuel within the fuel introducing chamber 42B crosses-over the partitioning plate 72, and flows-out to the fuel feed-out chamber 42A. Further, as shown in state (C) of FIG. 4, in a case in which acceleration toward the vehicle front side is applied, the fuel within the fuel introducing chamber 42B moves forward, and the liquid level becomes higher than the partitioning plate 72 in a vicinity of the front end of the partitioning plate 72. Therefore, some of the fuel within the fuel introducing chamber 42B crosses-over the partitioning plate 72, and flows-out to the fuel feed-out chamber 42A. Moreover, as shown in state (E) of FIG. 4, in a case in which acceleration toward the vehicle left side is applied, the fuel within the fuel introducing chamber 42B moves leftward, crosses-over the partitioning plate 72, and flows-out to the fuel feed-out chamber 42A. However, in a case in which acceleration toward the vehicle right side is applied, as shown in state (D) of FIG. 4, the fuel within the fuel introducing chamber 42B merely moves rightward and moves away from the partitioning plate 72. Therefore, the fuel does not cross-over the partitioning plate 72 and does not flow-out to the fuel feed-out chamber 42A.

As can be understood from the above explanation, at the fuel tank structure 12 of the present exemplary embodiment, in cases in which acceleration in any of the forward direction, the rearward direction, the leftward direction and the rightward direction of the vehicle acts on the fuel within the reserve cup 42, some of the fuel within the fuel introducing chamber 42B is made to flow into the fuel feed-out chamber 42A. Fuel within the fuel introducing chamber 42B can thereby be reliably supplied to the fuel feed-out chamber 42A.

Note that, in the above-described exemplary embodiment, the direction of placement of the partitioning plate 72 is an angle of substantially 45° with respect to the vehicle longitudinal direction as seen in plan view, but the direction of placement is not limited to the same. In other words, it suffices for the direction of placement to be such that fuel crosses-over the partitioning plate 72 in cases in which acceleration in any of the forward direction, the rearward direction, the leftward direction and the rightward direction of the vehicle acts on the fuel within the reserve cup 42.

The above describes an example in which the fuel tank structure of the present invention is structured by only one fuel accommodating portion (the fuel tank main body 32). However, the present invention may be applied to structures provided with plural regions that accommodate fuel, such as, for example, a so-called saddle-shaped tank or the like. In the case of a saddle-shaped tank, the reserve cup 42 is disposed at one of the regions that accommodate fuel, and therefore, the present invention may be applied with the reserve cup 42 being the fuel accommodating portion relating to the present invention.

What is claimed is:

1. A fuel tank structure comprising:
   a fuel accommodating portion that accommodates fuel; and
   a partitioning plate, through which fuel cannot pass, that partitions an interior of the fuel accommodating portion into a fuel feed-out chamber for feeding fuel out to an exterior, and a fuel-introducing chamber to which fuel is introduced from the exterior,
   wherein the partitioning plate is diagonally disposed with respect to a vehicle longitudinal direction, and fuel flowing into the fuel feed-out chamber is received from the fuel introducing chamber by flowing over a to edge of the partitioning plate.

2. The fuel tank structure of claim 1, wherein a top end of a peripheral wall of the fuel accommodating portion is higher than a top end of the partitioning plate.

3. The fuel tank structure of claim 1, wherein the partitioning plate stands upright substantially perpendicularly from a floor portion of the fuel accommodating portion.

4. The fuel tank structure of claim 1, wherein the fuel feed-out chamber is positioned at a vehicle rear side of the partitioning plate.

5. The fuel tank structure of claim 1, further comprising a fuel feed-out pipe having, within the fuel accommodating portion, a fuel suction opening for feeding fuel from the fuel accommodating portion out to the exterior, wherein the fuel suction opening is disposed within the fuel feed-out chamber.

6. The fuel tank structure of claim 1, further comprising: a fuel feed-out pipe having, within the fuel accommodating portion, a fuel suction opening for feeding fuel from the fuel accommodating portion out to the exterior; a fuel flow-in pipe communicating with the fuel feed-out pipe, and causing fuel to flow into the fuel accommodating portion; and a jet pump to which a fuel discharge opening of the fuel flow-in pipe is connected, the jet pump able to transfer fuel from a region other than the fuel flow-in pipe by utilizing negative pressure generated by fuel that flows-in from the fuel flow-in pipe, wherein the jet pump is disposed within the fuel introducing chamber.

7. The fuel tank structure of claim 1, wherein the partitioning plate is diagonally disposed at an angle of approximately 45° with respect to the vehicle longitudinal direction.

8. The fuel tank structure of claim 7, wherein the fuel introducing chamber is positioned at a diagonally front right side of the partitioning plate, and the fuel feed-out chamber is positioned at a diagonally rear left side of the partitioning plate.

9. The fuel tank structure of claim 1, further comprising a communicating hole formed in a lower portion of the fuel accommodating portion.

10. A vehicle having a fuel tank structure, the vehicle comprising:
    a longitudinal direction; and
    a fuel tank including a fuel-accommodating portion that accommodates fuel and a partitioning plate partitioning an interior of the fuel-accommodating portion into a fuel feed-out chamber for feeding fuel out to an exterior, and a fuel-introducing chamber to which fuel is introduced from the exterior,
    wherein the partitioning plate is diagonally disposed with respect to the vehicle longitudinal direction.

* * * * *